June 4, 1935. A. H. OELKERS 2,003,605
ROLLER BEARING ASSEMBLY
Filed Nov. 25, 1929
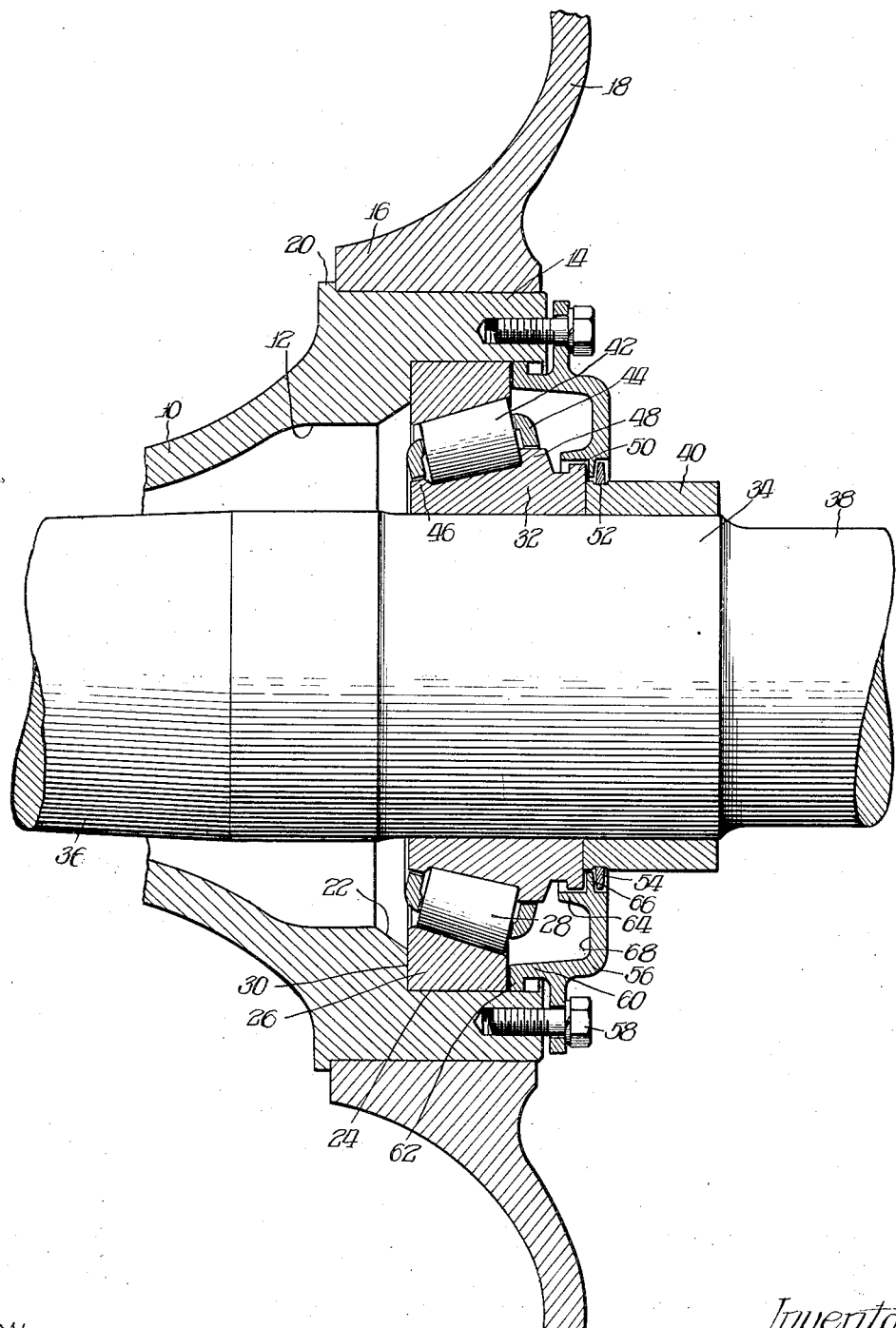

Patented June 4, 1935

2,003,605

UNITED STATES PATENT OFFICE 2,003,605

ROLLER BEARING ASSEMBLY

Alfred H. Oelkers, Chicago, Ill., assignor to American Steel Foundries, Chicago, Ill., a corporation of New Jersey Application November 25, 1929, Serial No. 409,494

17 Claims. (Cl. 295—36)

This invention pertains to roller bearing units, and more particularly to the arrangement of the structure of such assemblies for railway rolling stock to effectively prevent the entrance of foreign matter into bearing housings.

During the development of roller bearing units, it has been found that special details of construction are necessary to thoroughly prevent the entrance of foreign matter and moisture into bearing housings thereof. A roller bearing, to function properly over a long period of time, must be kept clean, thoroughly lubricated, and moisture must be excluded. Grit and dirt will cause a slight wearing away of the surface of the bearing, causing the same to become very inefficient. Moisture, of course, interferes with proper lubrication and, under some conditions, may even cause corrosion.

It is therefore an object of this invention to provide a simple, inexpensive and yet effective device for preventing the ingress of extraneous matter to the bearings of wheel and axle assemblies.

Another object of the invention is to provide a construction of wheel and axle assembly which will positively prevent any tendency of the entrance of foreign substances to a roller bearing assembly, and will effectively prevent the loss of lubricant during the operation of the roller bearing unit.

A further object of the invention is to provide a construction which is readily applicable to existing roller bearing units, one which is easily applied and serves to aid in maintaining the bearings in operative position.

With these and various other objects in view, the invention may consist of certain novel features of construction and operation, as will be more fully described and particularly pointed out in the specification, drawing and claims appended hereto.

In the drawing, which illustrates an embodiment of the invention, the figure is a fragmentary sectional side elevation through the lubricant and bearing recess of a roller bearing wheel and axle assembly embodying the invention.

The outer axle 10 of the assembly is provided with flared outer ends forming a lubricant recess 12 in said ends, the ends thereof terminating in hub portions 14 for the reception of hubs 16 of wheels 18, which are non-rotatably mounted on said axles 10 to revolve therewith, said wheels being positioned on said axles by means of the shoulder 20 provided thereon. The lubricant recess 12 is provided with an outwardly sloping portion 22 terminating in a bearing recess 24, said recess being adapted to receive the outer racerings or cups 26 of the roller bearing assembly 28, said cups being press-fitted into the bearing recess, their inward movement being determined by the shoulder 30 of the outer axle. The inner racering or cone 32 is shrunk or press-fitted on the surface 34 of the inner non-rotatable axle 36, said axle extending through the outer axle 10 and being provided with the outer bearing portions 38 adapted to be received in the usual A. R. A. journal boxes. It will be seen that the construction so far described is substantially that of applicant's co-pending application Serial No. 182,731, filed April 11, 1927.

The cones 32 are fixed in operative position by means of the shrink ring 40 disposed on portion 34 of the inner axle. It will be seen that in the type of bearing shown, the conical rollers 42 are retained between the race rings by means of the cage 44 and shoulders 46 and 48, and although the Timken type of bearing is shown, it will be understood that any type of anti-friction rollers may be used. The outer edge of the cone shown is provided with an annular upstanding shoulder 50, which is raised above the shrink ring 40, said shrink ring being provided with an annular groove 52 adjacent the cone. Said groove 52 is adapted for the reception of an upstanding baffle ring 54, the inside diameter of which ring is slightly less than the outside diameter of the shrink ring, the baffle ring being preferably of split construction, whereby it may be slightly sprung apart and snapped into the groove 52. As shown, the cover plate 56 is suitably apertured and is fastened to the hub portion of the outer axle by means of suitably spaced bolts 58. The cover plate is provided with an inwardly extending shoulder 60 having a ridge or flange 62 thereon, which is adapted to be disposed adjacent the cup for maintaining the same in operative position, whereby the anti-friction bearings are operatively positioned. The web of the cover plate extends toward the inner axle and is provided with an inwardly extending flange 64 terminating slightly inwardly of the shoulder 50, the cover plate being also provided with an inwardly extending flange or rib 66 interfitting with or fitting between the baffle ring 54 and the shoulder 50. A portion of the cover plate overlaps the baffle ring so that it is seen that a plane through the outer face of the cover plate is outside of the baffle ring.

With the construction shown, when the assembly is in operation, if any particles of dirt or moisture are thrown into position to have a tendency to enter the bearing cavity, the pumping action caused by the revolving radial surface adjacent the stationary radial surface of the baffle ring will mechanically prevent such entry, and therefore act as an efficient seal in protecting the roller bearing. This construction is likewise effective in preventing the loss of lubricant during operation, as the cover plate is so arranged that the lubricant is directed toward the bearing due to the inner cavity 68 determined by the flange 64, and because the centrifugal pumping action obtained by the close running clearance between the revolving cover plate and the end of the roller bearing cone, effectively prevents the passage of lubricant from the bearing cavity to the outside of the unit.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a wheel and axle assembly, the combination of an outer rotary axle having an enlarged hub portion and a bearing recess, a wheel having a hub non-rotatively mounted on said hub portion whereby said wheel and axle revolve together, said axle having a lubricant recess communicating with said bearing recess and partially within said enlarged hub portion, an inner non-rotatable axle extending through said outer axle and having a bearing portion thereon, anti-friction bearings mounted between said axles and in said bearing recess, a shrink ring mounted on said inner axle for positioning said anti-friction bearings, a cover plate mounted on said outer axle and extending toward said shrink ring, said shrink ring having a baffle ring thereon overlapping a portion of said cover plate to exclude foreign matter from said anti-friction bearings.

2. In a wheel and axle assembly, the combination of an outer rotary axle having an enlarged hub portion and a bearing recess, a wheel having a hub non-rotatively mounted on said hub portion whereby said wheel and axle revolve together, said axle having a lubricant recess communicating with said bearing recess and partially within said enlarged hub portion, an inner non-rotatable axle extending through said outer axle and having a bearing portion thereon, anti-friction bearings mounted between said axles and in said bearing recess, said bearings having a cone mounted on said inner axle, a shrink ring mounted on said inner axle for positioning said anti-friction bearings, a cover plate mounted on said outer axle and extending toward said shrink ring, said shrink ring having a baffle ring thereon, said cover plate having a portion interfitting with a portion of said cone and said baffle ring whereby foreign matter is excluded from said anti-friction bearings.

3. In a wheel and axle assembly, the combination of an outer rotary axle having an enlarged hub portion and a bearing recess, a wheel having a hub non-rotatively mounted on said hub portion whereby said wheel and axle revolve together, said axle having a lubricant recess communicating with said bearing recess and partially within said enlarged hub portion, an inner non-rotatable axle extending through said outer axle and having a bearing portion thereon, anti-friction bearings mounted between said axles and in said bearing recess, said bearings having a cone mounted on said inner axle and a cup mounted in said outer axle, a shrink ring mounted on said inner axle for positioning said anti-friction bearings, a cover plate mounted on said outer axle and having means cooperating with said cup to position the same, said cover plate extending toward said shrink ring, said shrink ring having a baffle ring thereon overlapping a portion of said cover plate to exclude foreign matter from said anti-friction bearings.

4. In a wheel and axle assembly, the combination of an outer rotary axle having an enlarged hub portion and a bearing recess, a wheel having a hub non-rotatively mounted on said hub portion whereby said wheel and axle revolve together, said axle having a lubricant recess communicating with said bearing recess and partially within said enlarged hub portion, an inner non-rotatable axle extending through said outer axle and having a bearing portion thereon, anti-friction bearings mounted between said axles and in said bearing recess, said bearings having a cone mounted on said inner axle and a cup mounted on said outer axle, a shrink ring mounted on said inner axle for positioning said anti-friction bearings, a cover plate mounted on said outer axle and having means cooperating with said cup to position the same, said cover plate extending toward said shrink ring, said shrink ring having a baffle ring thereon, said cover plate having a portion interfitting with a portion of said cone and said baffle ring whereby foreign matter is excluded from said anti-friction bearings.

5. In a wheel and axle assembly, the combination of an axle, a wheel, anti-friction bearings disposed between said wheel and axle, said bearings having a racering mounted on said axle, a shrink ring disposed adjacent said racering and having a baffle ring disposed thereon spaced from said racering, and a cover plate disposed between said wheel and axle and having a portion extending between said racering and baffle.

6. In a wheel and axle assembly, the combination of an axle, a wheel, anti-friction bearings disposed between said wheel and axle, said bearings having a racering, means for securing said racering in operative position, baffle means on said first named means, and a cover plate disposed between said wheel and axle and having a portion interposed between a portion of said racering and said baffle means.

7. A cover plate including a fastening portion, a web portion having an aperture therein, an annular flange projecting inwardly of said web at said aperture whereby a channeled recess is formed around said aperture, and an annular flange disposed at the junction of said web and said first named flange, said web being provided adjacent the fastening portion with an annular positioning flange provided with an undercut portion.

8. A cover plate including a fastening portion, a web portion having an aperture therein, an annular flange projecting inwardly of said web at said aperture whereby a channeled recess is formed around said aperture, and an annular flange disposed at the junction of said web and said first named flange, said web being provided with an annular positioning flange provided with an undercut portion.

9. In a wheel and axle assembly, the combination of an axle, a wheel, anti-friction bearings disposed between said wheel and axle, said bearings having a racering mounted on said axle, means for securing said racering in operative position, baffle means on said last named means, and a cover plate disposed between said wheel and axle and having a portion interposed between a portion of said racering and said baffle means.

10. In a wheel and axle assembly, the combination of an axle, a wheel, anti-friction bearings disposed between said wheel and axle, said bearings having a racering mounted on said axle and provided with a shoulder, means for securing said racering in operative position, baffle means on said last named means, and a cover plate disposed between said wheel and axle and having a portion interposed between said shoulder and said baffle means.

11. In a bearing device, the combination of a movable member, a normally stationary member, said members being spaced apart to provide a lubricant recess, bearing assemblies disposed between said members, said assemblies including a racering mounted on one of said members, means for securing said racering in operative position, said means being provided with baffle means disposed in spaced relation to said racering, and a closure member between said members and having a portion extending into said space between said racering and baffle means.

12. In a bearing device, the combination of an inner and outer member, said outer member providing a housing for said inner member and being spaced therefrom to provide a lubricant recess, bearing assemblies disposed between said members, said assemblies including a racering mounted on one of said members, means for securing said racering in operative position, said means being provided with baffle means disposed in spaced relation to said racering, and a closure member between said members and having a portion extending into said space between said racering and baffle means.

13. In a bearing device, the combination of an inner and outer axle member, said outer member serving as a housing for said inner member and being spaced therefrom to provide a lubricant recess, bearing assemblies disposed between said members, said assemblies including racerings mounted on one of said members, means for securing said racerings in operative position, said means being provided with baffle means disposed in spaced relation to said racerings, and closure members between said members each having a portion extending into said space between a racering and baffle means.

14. In a bearing assembly, the combination of an inner axle, an outer axle spaced therefrom to provide a lubricant recess, one of said axles being movable relative to the other, bearings between said axles, said bearings including a racering mounted on one of said axles, a member on the axle for securing said racering in operative position, said member having a baffle disposed in spaced relation to said racering, and a cover plate between said axles and having a portion extending into said space between said racering and baffle.

15. In a wheel and axle assembly, the combination of an axle, a wheel, anti-friction bearings disposed between said wheel and axle, said bearings having a racering, means for securing said racering in operative position, means for retaining bearing lubricant including baffle means substantially completely encircling said axle, and a cover plate disposed between said wheel and axle and having a portion substantially encircling said axle and interposed between a portion of said racering and said baffle means.

16. In a wheel and axle assembly, the combination of an axle, a wheel, anti-friction bearings disposed between said wheel and axle, said bearings having a racering, baffle means on said axle for retaining bearing lubricant, said means substantially completely encircling said axle, and a cover plate disposed between said wheel and axle and having a portion disposed adjacent said baffle means and extending inwardly of the outer periphery thereof toward said axle whereby an overlapping relation exists between said baffle means and said cover plate.

17. In a bearing device, the combination of a movable member, a normally stationary member, said members being spaced apart to provide a lubricant recess, bearing assemblies disposed between said members, baffle means nonrotatably secured to and carried by said normally stationary member and substantially encircling said member, and a closure member carried by said movable member and having a portion disposed adjacent said baffle means and extending inwardly of the outer periphery thereof toward said stationary member whereby an overlapping relation exists between said baffle means and said closure member.

ALFRED H. OELKERS.